May 25, 1965 S. B. RENTSCH, JR 3,185,149
PROTECTIVE GEAR
Filed July 9, 1964 6 Sheets-Sheet 3

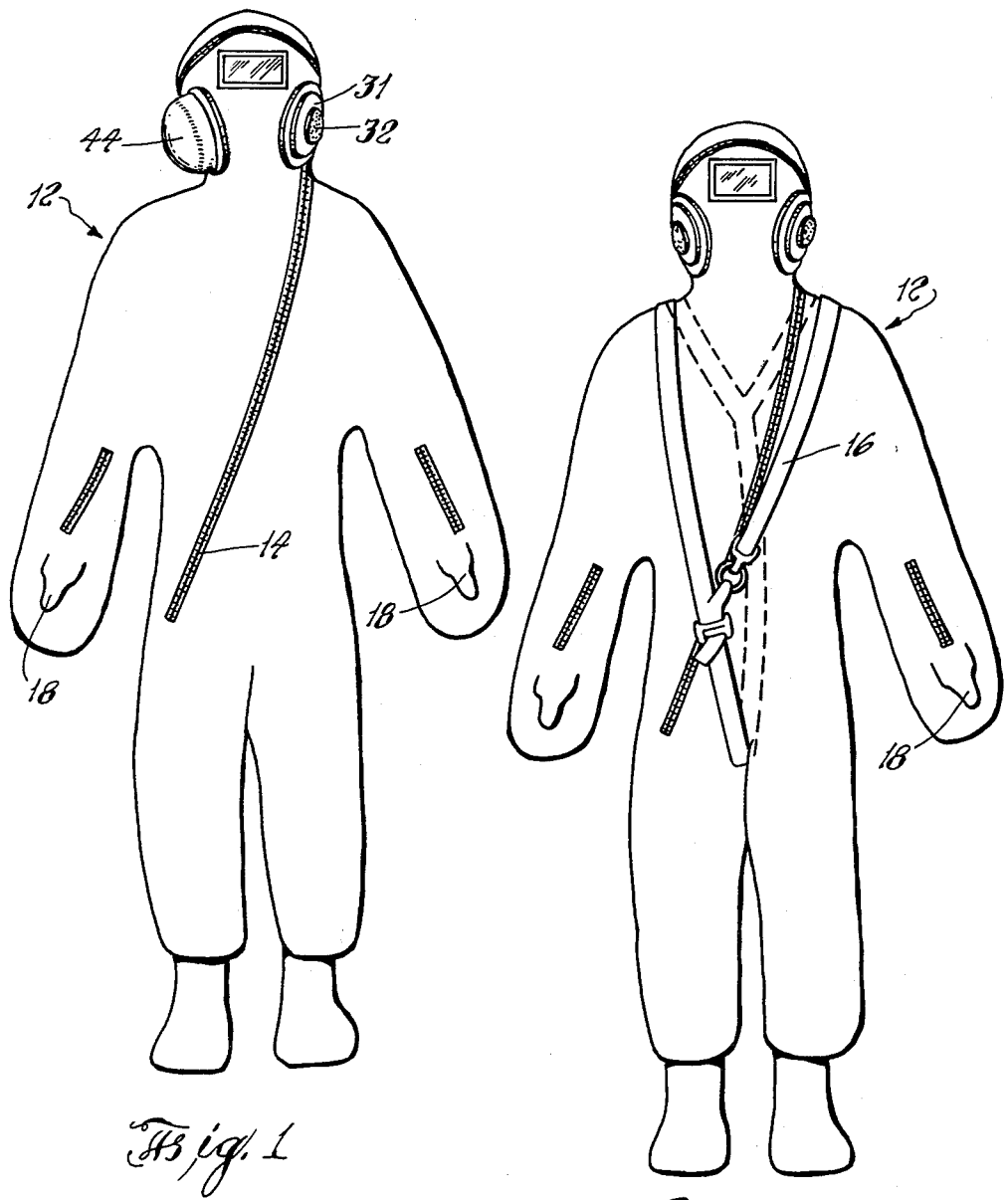

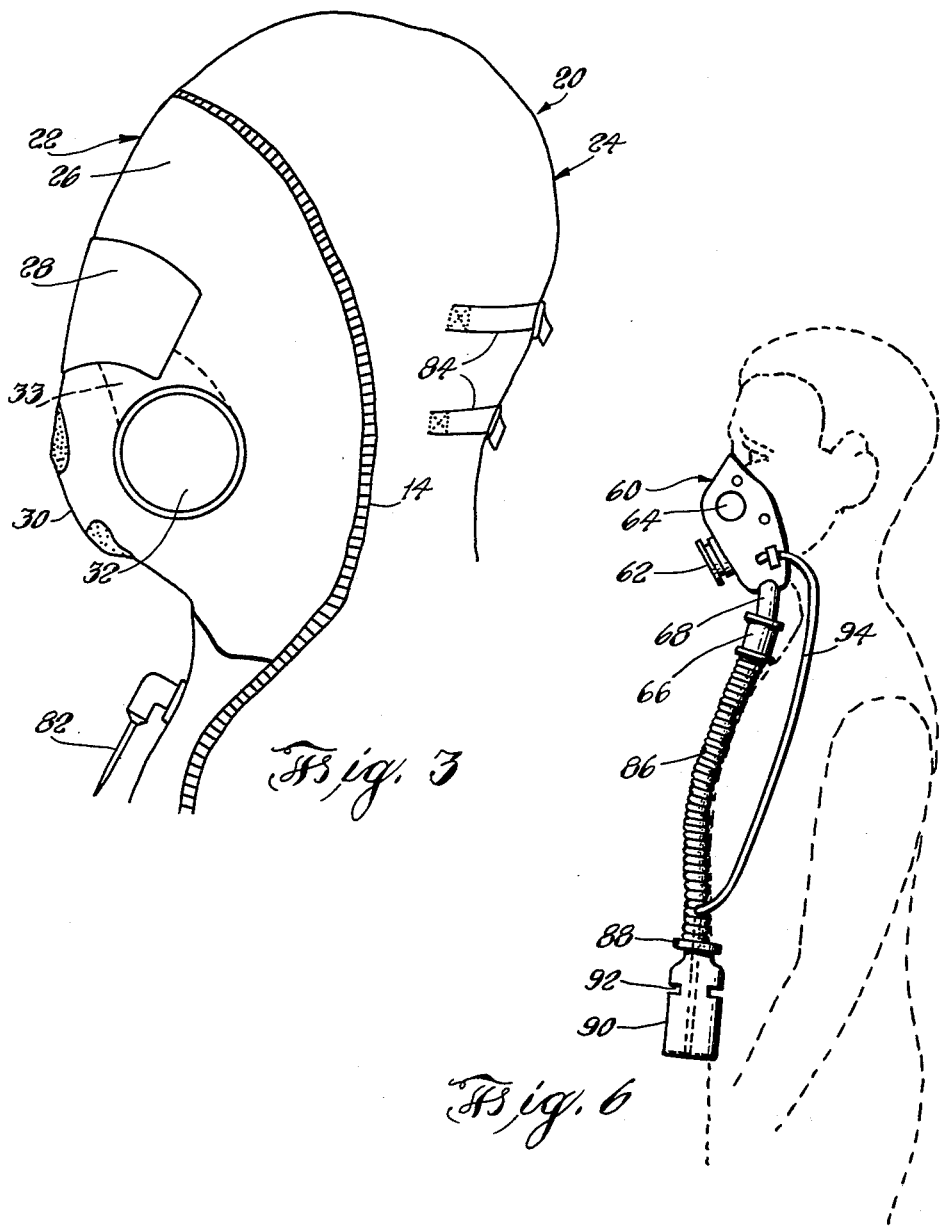

INVENTOR.
SAMUEL B. RENTSCH, JR.
BY Philip Schneider
Louis B. Appleton
ATTORNEYS

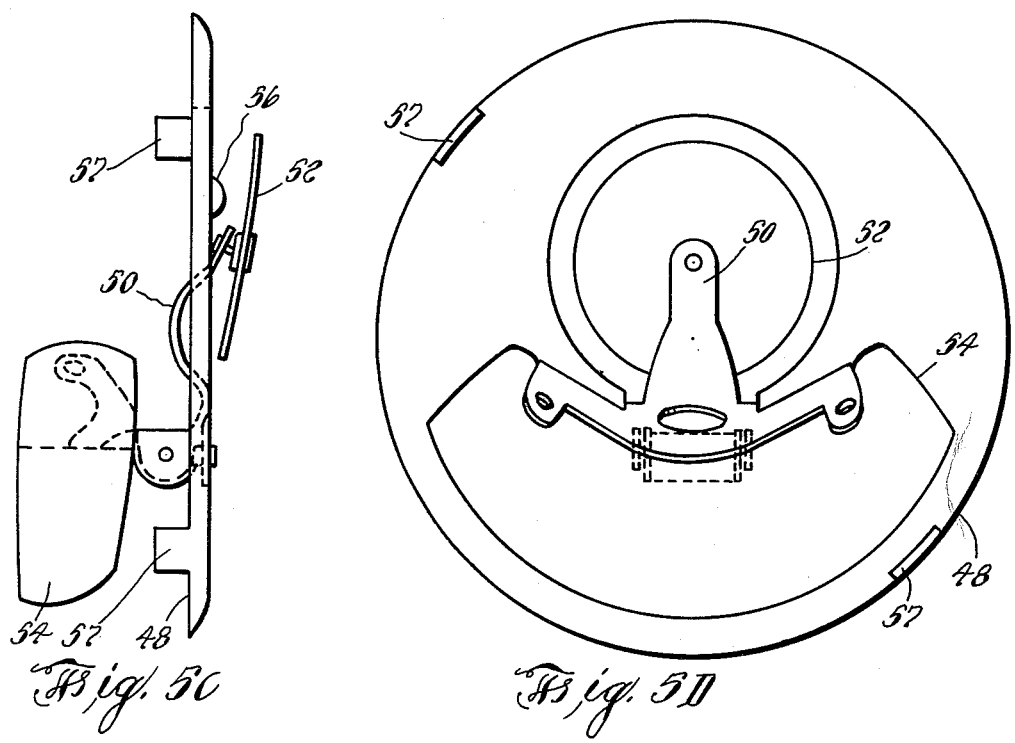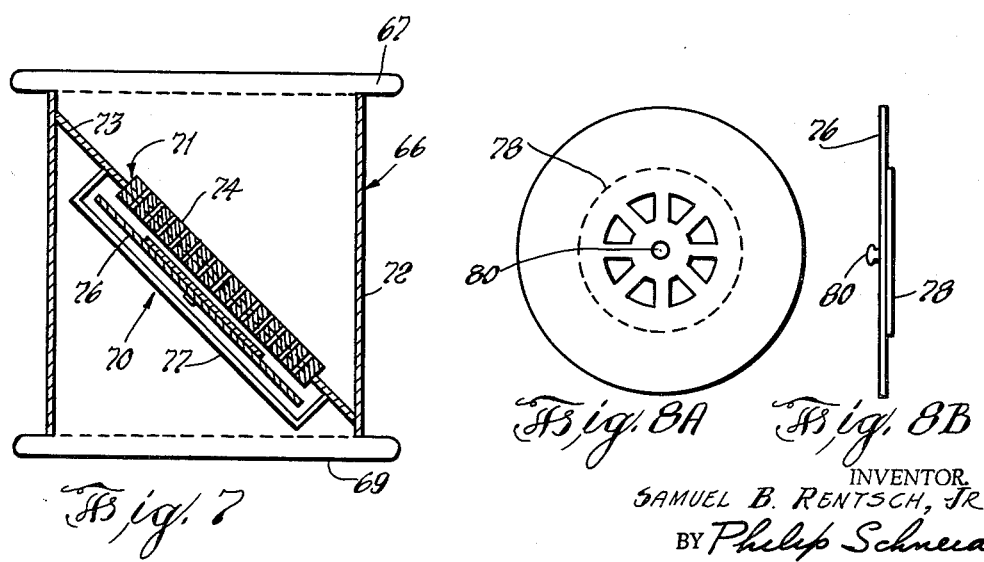

May 25, 1965   S. B. RENTSCH, JR   3,185,149
PROTECTIVE GEAR

Filed July 9, 1964   6 Sheets-Sheet 6

INVENTOR.
SAMUEL B. RENTSCH, JR.
BY Philip Schneider
Louis B. Appleban
ATTORNEYS

United States Patent Office 3,185,149
Patented May 25, 1965

3,185,149
PROTECTIVE GEAR
Samuel B. Rentsch, Jr., 242 Hubbard St.,
Glastonbury, Conn.
Filed July 9, 1964, Ser. No. 381,598
10 Claims. (Cl. 128—144)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial No. 851,200, filed November 5, 1959, now abandoned, and application Serial No. 99,643, filed March 30, 1961, and now abandoned.

This invention relates to protective gear and especially to a submarine escape suit.

The presently accepted method of escape which is taught in the U.S. Submarine Service is the "Buoyant Ascent." This method utilizes an inflatable life jacket which is equipped with relief valves to vent off the excess air volume resulting from expansion during escape. The escapee who is wearing the inflated life jacket goes through a pressure equalization process in the escape trunk. Once this is completed, he ducks out the escape hatch, exhales, emptying his lungs of all air (except for residual air) and then literally "pops" to the surface.

The disadvantages of this method are readily apparent. In addition to not affording any protection from the water and cold, it requires the escapee to act contrary to his instincts. In other words, he must exhale all the way to the surface.

There have been instances in which submarine personnel have been expelled accidentally from escape hatches without any protective apparatus and have popped to the surface without harm in a large bubble of air which permitted them to breathe while ascending.

Speed of ascent is an important factor in escapes from a submarine lying at great depths beneath the surface of the ocean. The British Submarine Escape Committee stated in 1946: "To escape from 200 to 300 feet is only possible if a man is under pressure for a very short time." Thus, positive buoyancy should be provided to propel the escapee to the surface.

The above facts indicate that if a man is enclosed in a bubble of air, he can escape without injury from a submarine at depths of over 300 feet. The present invention permits a man to be so enclosed, or at least encloses his head in a bubble of air, so that he can rise to the surface without harm. The proposed escape suit thus enables completely untrained personnel to make dry escapes, breathing naturally all the way to the surface. When once on the surface, the suit provides protection from the elements, buoyancy, warmth, and a conservation of body heat and moisture.

The object and advantages of the present invention are accomplished by means of a protective suit incorporating a novel breathing mask. The suit is fully waterproof and covers a man completely. The suit fits loosely, especially around the head, thereby providing room for an accumulation of air.

The mask permits the wearer to breathe air entrapped in the suit while the wearer is ascending to the surface of the water. Once upon the surface, a snorkel device enables the wearer to inhale atmospheric air except when this device is closed by the action of a wave. The mask functions automatically to provide the wearer alternatively with access to atmospheric air or entrapped air according to changing conditions.

A water condenser is provided to condense the water vapor which is exhaled from the lungs of the wearer. The condenser is located at the level of the man's liver and acts to provide heat in this area, thereby retarding the loss of body heat and protecting the wearer against the effects of prolonged exposure to cold sea-water.

The protective gear may be provided with other features, if desired, as will be described hereinafter.

An object of this invention is to enable submarine personnel to escape from submerged submarines without harm.

Another object is to enable submarine personnel to escape without harm from submarines submerged at depths of over 300 feet using rapid equalizations and ascents.

A further object is to protect personnel from the harmful effects of prolonged exposure to sea water and cold temperatures.

Other objects and many of the attendant advantages of this invention will be readily appreciated as the same becomes better understood by reference to the following detailed description when considered in connection with the accompanying drawings wherein:

Similar reference characters apply to similar elements in the different views.

FIG. 1 is a view of the exterior of an embodiment of the protective suit;

FIG. 2 is a view illustrating one mode of attachment of the adjusting straps;

FIG. 3 is a side view of the hood;

Figure 4A:
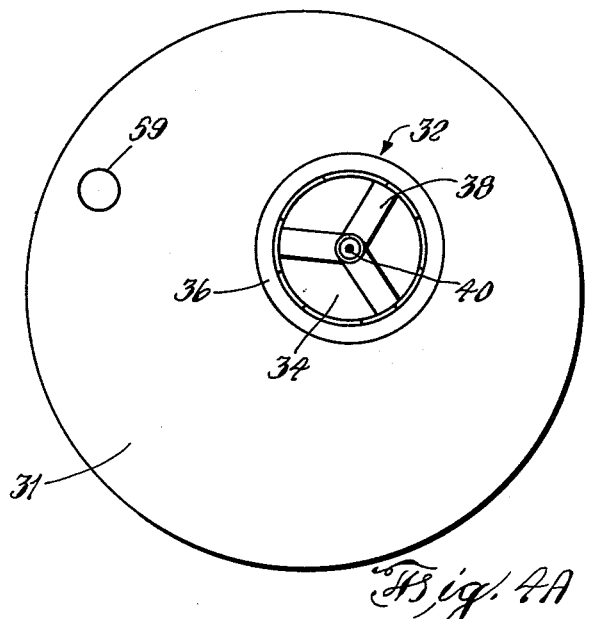
Figure 5A:
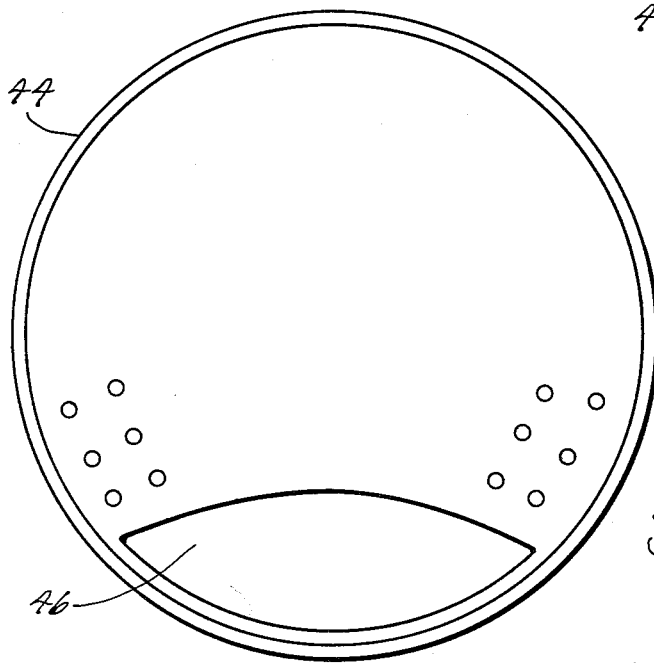
Figure 5B:
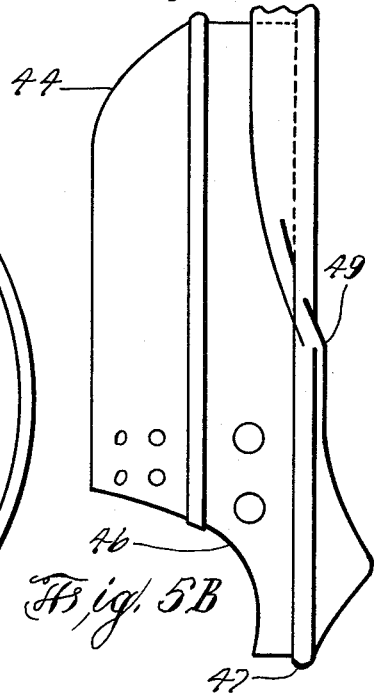
Figure 5E:
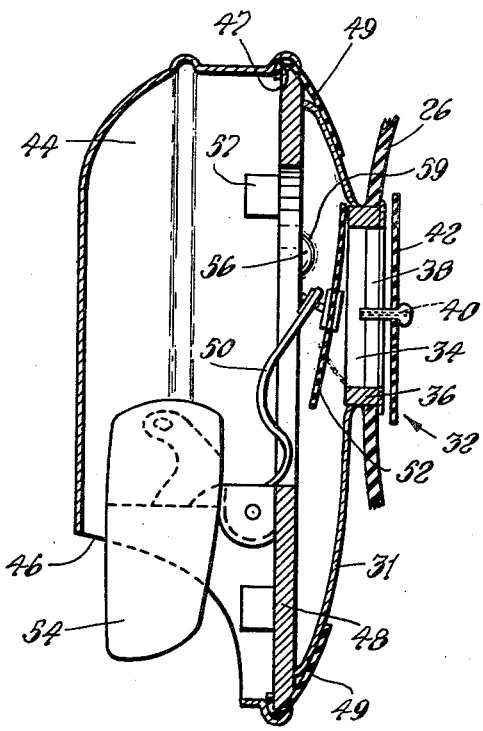
Figure 9:
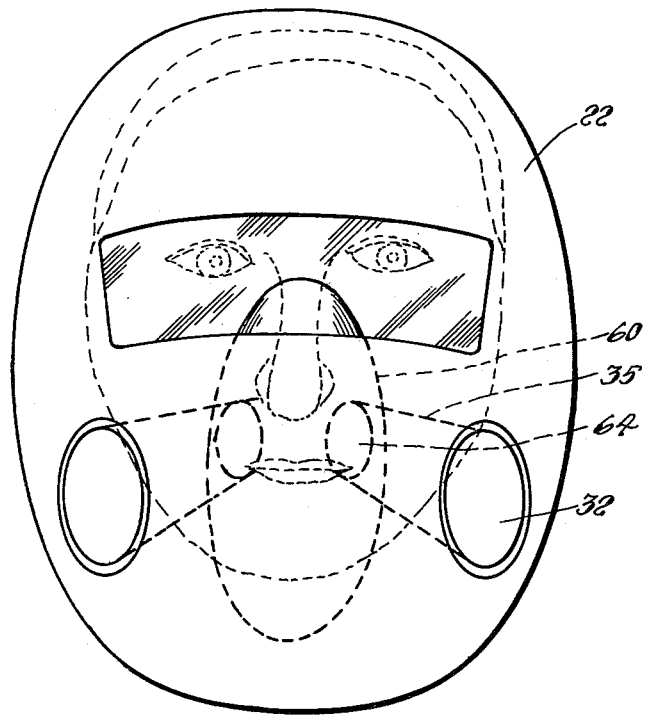

FIGS. 4A and B are front and side views, respectively, of the mounting base for the air-intake valve of the outer mask;

FIGS. 5A, B, C and D are views illustrating the details of the components of the snorkel device;

FIG. 5E is a vertical cross-section taken throughout the assembled snorkel device;

FIG. 6 is a side view of the inner mask and condenser device in relation to the face and body of the wearer;

FIG. 7 is a side view, in section, of the air-intake-and-exhaust valve associated with the inner mask;

FIGS. 8A and B are front and side views, respectively, of the movable disc and diaphragm of the air-intake-and-exhaust valve; and FIG. 9 is an illustration of the direct coupling between the air-intake parts of the outer and inner face masks in one embodiment of the invention.

FIG. 1 shows a front view of the protective suit 12. The suit fabric is a waterproof, tear-resistant fabric such as neoprene-coated nylon. It may be fabricated in one piece, as shown, or in several pieces, such as separate hood, jacket, pants, boots and gloves. The separate pieces can be attached by means of waterproof zippers, such as the British BDM Pressure-Proof Type, or by any other suitable means such as ring-type, bayonet-lock closures with rubber sealing rings between the metal parts.

A waterproof zipper 14 extends from the upper part of the right leg across the chest and left side of the neck area, up past the left ear, around the head along the forehead hair-line region and down the right side past the ear to approximately the junction of the neck and right shoulder. This permits the wearer to don the suit and to wear it with an open hood. The suit 12 fits very loosely and may be provided with adjusting straps 16 (as shown in FIG. 2) for adjusting the suit to differently mixed sized wearers.

The section of the suit 12 into which the hand of the wearer fits may be fabricated with a thumb sheath 18 to permit better manipulation of objects by the wearer.

The hood 20 is separated into a front section 22 and a rear section 24 by the zipper 14 (see FIG. 3). The front section comprises an outer and an inner mask fastened together by suitable means such as snap fasteners. The outer mask 26 may be a modified Navy Mark V gas mask attached to the suit fabric in a watertight fashion. (Another type of outer mask which may be modified for use with this invention is the type known as the Scott-oramic Face Mask manufactured by the Scott Aviation Corporation of Lancaster, New York.) The outer mask 26 includes a glass or plastic face plate 28 for visibility, a speaking diaphragm 30, a pair of air-intake valves 32 of the rubber-diaphragm type (one adjacent to each cheek) and a pair of air channels 33 (each one leading from one intake valve 32 to the face plate 28) to prevent fogging of the face plate 28. The outer mask 26 is shown here without the snorkel device.

FIG. 4A shows the air-intake valve 32 and its mounting base 31 in plan view. The valve 32 contains a circular excised area, or port, 34 enclosed by a ring 36 of rigid material, the ring 36 supporting three struts 38 extending inwardly from the ring 36 at 120° intervals and connected at the center to form a mounting yoke. A small hole 40 is drilled through the struts 38 at the central connection and through the diaphragm 42.

Figure 4B:
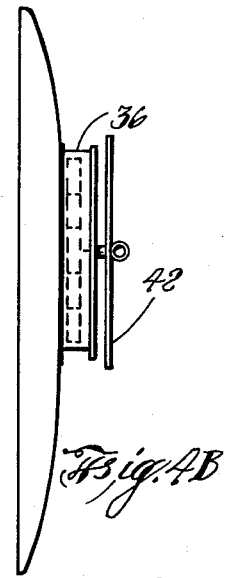

In FIG. 4B, the air-intake valve 32 and its mounting base 31 are shown in side view. A rubber diaphragm 42, which is shown spaced from the ring 36 for purposes of clarity, normally closes off the air-intake port 34. When the wearer takes a breath, suction pulls the edges of the diaphragm 42 back, allowing air to come through.

The snorkel device is shown in FIG. 5C. This fits into the outer shell 44 of the activated charcoal canister used in the Navy Mark V gas mask. The shell 44 is shown in plan view in FIG. 5A and side view in FIG. 5B. The shell has an opening 46 along its bottom through which water or air may enter freely when it is not sealed. A mounting plate 48 for the snorkel device fits into place inside the annular ridge 47 at the edge of the shell 44, and is held in place by a rubber snap ring 49; the mounting plate 48 is shown in side view in FIG. 5C and plan view in FIG. 5D. The mounting plate 48 pivotally supports an arm 50, one end of which carries a diaphragm 52 and the other end of which carries a cork float 54. When float 54 is moved upwardly, the arm 50 pivots so that the diaphragm 52 is forced into contact with the ring 36 of the air-intake valve 32. The snorkel diaphragm 52 then covers the air-intake port 34 of the air-intake valve 32 sealing it against passage of water and air until the cork float 54 moves downward. Alignment page 57 and an embossment 56 on the mounting plate 48 and complementary grooves and indentations (e.g., 59) on the mounting base 31 and the shell 44 may be employed to align the diaphragm 52 and the excised area 34 of the intake valve and to position the canister shell 44 properly.

The small hole 40 in the mounting yoke struts 38 and diaphragm 42 of the air-intake valve 32 prevents the formation of a vacuum between the valve diaphragm 42 and the snorkel diaphragm. This vacuum might prevent the snorkel diaphragm 52 from releasing when water no longer acts to buoy up the cork float 54.

The inner mask 60, shown in side view in FIG. 6, is similar to the Mine Safety Appliances mask, type 72534, which is an anesthetic-type mask. It is fastened to the outer mask 22 by means of snap fasteners, or in any other suitable manner. The inner mask 60 fits tightly over the nose, mouth and chin of the wearer and contains a speaking diaphragm 62. A pair of air intake ports 64 are situated at the sides of the inner mask near the cheek areas. Each of these inner-mask intake ports 64 is directly coupled by means of tubing 35 or any other suitable means to the nearest air-intake valve 32 in the outer-mask 26. This direct coupling is shown in FIG. 9. An air-intake-and-exhaust valve 66 (which hereafter will usually be denoted simply by the term—"ambifunctional valve" to indicate that it can function both as an intake and as an exhaust valve) hangs down below the chin section connected thereto by means of a hollow tube, or hose, 68 which can be fabricated from semi-rigid plastic material and is affixed to the ambifunctional valve 66 at its upper flange 67. A flexible rubber tube 86 is affixed by any suitable means to the lower flange 69 of the ambifunctional valve 66. The lower end of the rubber tube 86 is connected to a fastening ring 88 by a force fit, or by threading which mates with the threaded top of a plastic condenser bottle 90, which may be fabricated from polystyrene plastics, for example. The bottle 90 has several horizontal slit openings 92 about one-quarter of the way down from the top, which allow air to pass through. A semi-rigid plastic straw 94, which may be made of polystyrene, extends from the bottom of the bottle through a small opening in the rubber tube 86 up to the mouth region of the wearer of the suit where it may be removably fastened either to the outside of the inner mask 60 or to the inside of the outer mask 26.

The ambifunctional valve 66 is shown schematically in FIG. 7. The valve 66 may be similar to the Mine Safety Appliance mica valve. A valve assembly 70 is mounted diagonally across a metal housing 72. The valve assembly 70 includes a housing divider 71 which forms a fixed diagonal wall across the cylindrical housing 72. The divider 71 has an outer plate-like section 73 having an elliptical periphery in contact with the inside wall of the housing 72, and a circular and somewhat thicker inner disc section 74 which is pierced by air holes. A movable disc 76 large enough to cover the air holes in the conic section 74, ordinarily falls against retaining means 77 because of the pull of gravity. Retaining means 77 is merely a pair of bent wires crossing each other at a 90° angle.

The movable disc 76 also contains air holes which are normally closed by a rubber diaphragm 78 (see FIG. 8A), the diaphragm 78 and the disc 76 being held together by means of a retainer button 80.

The operation of the ambifunctional valve 66 is as follows:

When the wearer of the suit is submerged and is rising to the surface, he can inhale air from the body of the suit for which the hood cavity constitutes a reservoir through the slits 92 in the condenser bottle 90, the hose 86, the ambifunctional valve 66 and the hose 68. When he is on the surface, the snorkel device opens the air-intake ports 34 and fresh air can be breathed. In the first case, all of the exhaled air and, in the second case, most of the exhaled air passes down through the hose 68 to the ambifunctional valve 66. The exhaled air passes through the holes in the fixed disc 74 and pushes past the periphery of the movable disc 76 through the open bottom of the ambifunctional valve 66 down the rubber tube and through the openings in the condenser 90 into the air space within the suit. Upon inhalation, if the snorkel air-intake valves are open, the movable disc assembly is drawn up against the fixed disc 74 and held there by suction, the air holes in the fixed disc 74 being closed thereby. Air is drawn in only through the snorkel air-intake valves at this time. However, if the snorkel air-intake valves should be closed, as during submersion of the wearer or as a result of the action of a wave, inhalation by the wearer results in a greater suction on the movable disc assembly of the ambifunctional valve 66. This greater suction lifts and crinkles the peripheral edge of the rubber disc 78 which breaks the suction seal and the peripheral edge of the rubber disc begins to flutter, allowing air from the air space in the suit to pass through the air holes in the movable disc 76, and thence through the air holes in the fixed disc 74 to the lungs of the wearer. Thus, when the wearer cannot breathe atmospheric air through the snorkel device, the ambifunctional valve 66 automatically permits him to utilize the air trapped inside the suit. But, when atmospheric air is available, it is supplied to him exclusively.

The condenser bottle 90 extends down into the body portion of the protective suit and is located at the level of the wearer's liver. This provides the suit with some of its unique protective advantages. The heat and moisture of the exhaled air from the lungs, which would normally be wasted, is utilized by conducting the expired air through a long tube to the inside of the suit. Warm water condenses in the condenser bottle 90, and the liver, which is the body's main heat-producing organ, benefits from the heat radiated from the condenser bottle 90 which is in its vicinity. This warmth causes the liver to work more efficiently and the loss of body heat, often the cause of death in frigid waters, is thereby retarded.

The condenser 90 accomplishes two other results. It condenses out the major portion of the moisture in the expired air, thus preventing this moisture from dampening the clothes of the wearer and decreasing their insulating properties. It also makes this moisture available for drinking, which may be very important in increasing the chances of survival of a person floating in the ocean for several days.

The suit is provided with a relief valve 82 (see FIG. 3) which is located in the chest region. As the wearer rises to the surface, the decrease of outside pressure allows the air in the suit to expand excessively and, if a relief valve were not provided, the suit might rupture.

Snugging straps 84 may also be provided on the rear section 24 of the hood 20 to keep the inner mask 60 in close contact with the face of the wearer.

A variation of the embodiment of the invention heretofore described has no direct coupling between the outer mask valves 32 and the inner mask air-intake ports 64. In this embodiment, the valve 66 need not be ambifunctional but need only be an exhaust valve, since the air within the suit can be breathed directly through the open ports 64 of the inner mask. However, the exhaled air is still deflected downward through valve 66 to the condenser 90 to provide the warmth needed for survival in cold environments.

Various other features may be built into the protective suit 12, if desired. For example, there may be internal pockets for housing items such as a whistle and a signalling mirror. Or, the legs of the suit from the knee down may be double-layered to provide containers for fresh water. A hollow tube may extend from each of these areas to the hood 20 so that the wearer may employ the tube to suck up the water. The water can also act as ballast.

Obviously many modifications and variations of the present invention are possible in the light of the above teachings. It is therefore to be understood that within the scope of the appended claims the invention may be practiced otherwise than as specifically described.

I claim:

1. In combination with a watertight, hooded protective garment, face mask means, a snorkel device and ambifunctional valve means, said face mask means providing a wearer with access to atmospheric air and comprising an outer mask integral with the hood of said garment and an inner mask affixed thereto, said inner mask being of the anesthetic type and having a port therein, and said outer mask having an air-intake valve which is directly coupled with said inner-mask port, said snorkel device comprising sealing means adapted to be moved into contact with said outer-mask air-intake valve to effect a water-tight closure thereof, a pivotable arm at one end of which said sealing means is mounted, means mounted upon said outer face mask for supporting said pivotable arm, and a float mounted at the other end of said pivotable arm, the buoyancy of said float when said mask means is immersed in water acting to pivot said sealing means against said air-intake valve thereby sealing it against entry of water when the outside water reaches a preselected level relative to said air-intake valve and unsealing it when the water drops below said preselected level, and said ambifunctional valve means connected to said inner mask to permit exhalation of air therethrough at all times and to permit inhalation of air therethrough whenever said outer-mask intake valve is sealed by said snorkel device.

2. In combination with a watertight, hooded protective garment, face-mask means, a snorkel device and ambifunctional valve means, said face-mask means providing a wearer with access to atmospheric air and comprising an outer mask integral with the hood of said garment and an inner mask affixed thereto, said inner mask being of the anesthetic type and having a port therein, and said outer mask having an air-intake valve which is directly coupled with said inner-mask port, said snorkel device comprising sealing means adapted to be moved into contact with said outer-mask air-intake valve to effect a watertight closure thereof, a pivotable arm at one end of which said sealing means is mounted, means mounted upon said outer face mask for supporting said pivotable arm, and a float mounted at the other end of said pivotable arm, the buoyancy of said float when said mask means is immersed in water acting to pivot said sealing means against said air-intake valve thereby sealing it against entry of water when the outside water reaches a preselected level relative to said air-intake valve and unsealing it when the water drops below said preselected level, and said ambifunctional valve means connected to said inner mask to permit exhalation of air therethrough at all times and inhalation of air therethrough whenever said outer-mask air-intake valve is sealed, said ambifunctional valve means comprising a port member and a movable diaphragm having a resilient member, said diaphragm normally sealing said port member when air is being inhaled through the outer-mask air-intake valve but allowing air through said port member when said face-mask valve is sealed, the extra suction arising at this time acting to distort said resilient member so that air is allowed to enter through said valve means.

3. A combination as set forth in claim 2, wherein said outer mask includes a transparent face plate and an air channel leading from said outer-mask air-intake valve to said face plate to minimize fogging thereof.

4. A watertight protective suit suitable for a human being in an aqueous environment comprising, in combination: a watertight, hooded garment, large enough to enclose the body of a wearer and loose-fitting enough, at least in the neck and head area, to form a pocket for the entrapment of air, said garment including a watertight closure permitting entry of the wearer into said garment; means affixed watertightly to the hood providing the wearer with access to air, said means having an air-intake port providing access to atmospheric air and a snorkel device comprising sealing means movable into contact with said port to effect a watertight closure thereof, when the outside water reaches a predetermined level relative to said air-intake port and to unseal it when said water drops below this predetermined level; an inner mask for covering the nose and mouth apertures of said human being, said mask being formed with an air-intake opening therein directly coupled with said air-intake port; an air-intake-and-exhaust valve coupled to said inner mask at one end; a container having at least two openings therein; and a tube connected between said valve and one opening in said container, air exhaled through said face mask and said valve passing through said tube to said container, the other of said openings in said container providing a passageway for said air between said container and the inside of said protective suit, said container being located within the body section of said garment.

5. A protective suit as set forth in claim 4, wherein the length of said tube is sufficient to permit said container to be located substantially at the level of the liver of said human being.

6. A protective suit as set forth in claim 4, including tube means extending from the bottom of said container to the vicinity of the mouth of said human being, enabling him to drink the contents of said container.

7. In combination, hood means, a snorkel device and ambifunctional valve means.

said hood means impermeably covering at least the head and neck regions of the wearer and being large enough to form a pocket for the entrapment of air in the head and neck regions, said hood means including outer face mask means having an air-intake port therein and inner face mask means having an air-intake port therein, said outer-mask and inner-mask air-intake port being directly coupled, said snorkel device comprising sealing means adapted to be moved into contact with said outer-mask air-intake port to effect a fluid-tight closure thereof, a pivotable arm at one end of which said sealing means is mounted, means mounted upon said outer face mask for supporting said pivotable arm, and a float mounted at the other end of said pivotable arm, the buoyancy of said float when said hood means is immersed in water acting to pivot said sealing means against said outer-mask air-intake port thereby sealing it against entry of water when the outside water reaches a preselected level relative to said air-intake port and unsealing it when the water drops below said preselected level, and said ambifunctional valve means being located within said hood means and connected to said inner mask to permit exhalation of air therethrough at all times and to permit inhalation of air therethrough whenever said outer-mask intake port is sealed by said snorkel device.

8. A watertight protective suit suitable for a human being in an aqueous environment comprising, in combination:

a watertight, hooded garment, large enough to enclose the body of a wearer and loose-fitting enough to form a pocket for the entrapment of air in the head and neck area, said garment including a water-tight closure permitting entry of the wearer into said garment;

means affixed watertightly to the face portion of the hood of said garment for providing access to atmospheric air, said means including a face mask having an air-intake port and a snorkel device having a float and sealing means, the buoyancy of said float in water acting to actuate said sealing means to seal said air-intake port against entry of water when the water reaches a preselected level relative to said port and unsealing it when the water drops below said preselected level; and internal breathing means for providing air from the interior of said garment when said air-intake port in said hood mask is sealed, said internal breathing means including an inner face mask and an ambifunctional valve, said inner face mask enclosing the mouth-and-nostril area of the wearer and having at least one air-intake port therein, said outer-mask and inner-mask air-intake ports being directly coupled with each other, said ambifunctional valve being connected to said inner mask.

9. A watertight protective suit suitable for a human being in an aqueous environment comprising, in combination:

a watertight, hooded garment, large enough to enclose the body of a wearer and loose-fitting enough to form a pocket for the entrapment of air in the head and neck area, said garment including a watertight closure permitting entry of the wearer into said garment;

means affixed watertightly to the face portion of the hood of said garment for providing access to atmospheric air, said means including a face mask having an air-intake port and a snorkel device having a float and sealing means, the buoyancy of said float in water acting to actuate said sealing means to seal said air-intake port against entry of water when the water reaches a preselected level relative to said port and unsealing it when the water drops below said preselected level;

internal breathing means for providing air from the interior of said garment to said wearer when said air-intake port in said hood mask is sealed, said internal breathing means including an inner face mask enclosing the mouth-and-nostril area of the wearer and having at least one air-intake port therein, and an exhaust valve located within said garment and coupled with said inner face mask; and a container having at least two openings therein, and tubing connecting one of said openings with said exhaust valve, said container being located within the body section of said garment.

10. A device as set forth in claim 9, wherein the length of said tubing is sufficient to permit said container to be located substantially at the level of the liver of said human being.

References Cited by the Examiner

UNITED STATES PATENTS

| 102,823 | 5/70 | Jacobs | 128—144 X |
|---|---|---|---|
| 1,091,859 | 3/33 | Anderson | 9—332 X |
| 2,881,758 | 4/59 | Motsinger | 128—144 |
| 2,888,010 | 5/59 | Girden | 128—142 |
| 2,891,540 | 6/59 | Tietze | 128—141 |

RICHARD A. GAUDET, *Primary Examiner.*